United States Patent [19]

Yasuda

[11] 4,314,049
[45] Feb. 2, 1982

[54] POLYESTER RESIN COMPOSITION

[75] Inventor: Shinichiro Yasuda, Wakayama, Japan

[73] Assignee: Kao Soap Co., Ltd., Tokyo, Japan

[21] Appl. No.: 130,302

[22] Filed: Mar. 14, 1980

[51] Int. Cl.³ ............................................. C08G 63/18
[52] U.S. Cl. .................................. 528/128; 528/190; 528/193
[58] Field of Search ........................ 528/128, 190, 193

[56] References Cited

U.S. PATENT DOCUMENTS

| | | | |
|---|---|---|---|
| 3,681,106 | 8/1972 | Burns et al. | 260/40 R |
| 3,787,526 | 1/1974 | Burns et al. | 260/9 |
| 3,865,789 | 2/1975 | Wyhof | 528/193 |
| 3,865,869 | 2/1975 | Kuehn et al. | 528/193 |
| 3,884,876 | 5/1975 | Cottis et al. | 528/193 |

*Primary Examiner*—Maurice J. Welsh
*Attorney, Agent, or Firm*—Blanchard, Flynn, Thiel, Boutell & Tanis

[57] ABSTRACT

A polyester resin composition is produced by a reaction of:
(A) a dicarboxylic acid and
(B) a polyol comprising an etherified diphenol of the formula [I]:

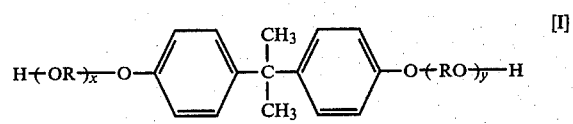

in which R is an alkylene having from 2 to 3 carbon atoms; and x and y are each a positive integer with the proviso that the average sum of both is from 2 to 7, and (C) from about 0.05 to about 10 mol %, based on the polyol(B), of a compound having one or two phenolic hydroxy radicals and either (i) an alcoholic hydroxy radical or (ii) a carboxyl radical. The polyester is prevented from caking and blocking.

6 Claims, No Drawings

POLYESTER RESIN COMPOSITION

The present invention relates to a polyester resin in which caking or blocking is hardly caused.

It is well-known that a polyester resin is obtained from an etherified diphenol and a dicarboxylic acid and is further improved by the use of a polyol having three or more functional groups. See U.S. Pat. Nos. 3,787,526 and 3,681,106.

Those polyester resins, alone or incorporated with suitable amounts of additives, pigments, etc., are used in the form of fine powders as binders for glass fibers and electrophotographs. However, in many cases, caking or blocking occurs during use or storage and causes problems.

In using the polyester resin powders as binders for glass fibers, carbonaceous fibers and electrophotographs, there are optimum softening points. If the softening point is too high, there is a fear of causing gelation during the production and, in addition, energy loss is invited during use, and, if it is used as a binder in electrophotography, the paper is denatured. On the other hand, if the softening point is lowered, the melting point is inevitably lowered as a matter of course, whereby blocking or caking occurs.

If the softening point is elevated, the melting point is also elevated a little but it is not always elevated to a point in a preferred temperature range, and this invites the occurrence of the undesirable phenomena as described above.

Softening point is determined by a ring-and-ball test according to JIS K-2531. The softening point is an important factor in the adhesion of glass fibers and the fixing of toners in electrophotography.

Melting point is determined by means of D.S.C. (differential scanning calorimeter). If the melting point is too low, caking or blocking is apt to be caused which will seriously affect the storage stability of the resin.

Therefore, for overcoming the above described defects, it is required that the melting point be elevated by such a method that the properties such as adhesion, thermal stability and solubility in styrene will not be deteriorated in the production of glass fibers, and adhesion, picture quality, electric properties and clarity will not be deteriorated in electrophotography.

Although there has been proposed a method wherein an additive such as a caking-preventing agent is incorporated, such a method often invites reduction in capacity and therefore is not desired.

The present invention provides polyester resins free of said defects.

The present invention relates to a polyester resin composition produced by a reaction of:
(A) a dicarboxylic acid and
(B) a polyol comprising an etherified diphenol of the formula [I]:

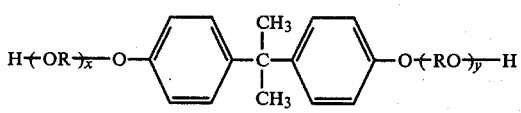

in which R is an alkylene having from 2 to 3 carbon atoms; and x and y are each a positive integer with the proviso that the average sum of both is from 2 to 7, and (C) from about 0.05 to about 10 mol %, based on the polyol (B), of a compound having one or two phenolic hydroxy radicals and either (i) an alcoholic hydroxy radical or (ii) a carboxy radical.

As concrete examples of the compound (C), there may be mentioned diphenolic acid, p-hydroxybenzoic acid, 2,4-dihydroxybenzoic acid, p-hydroxyphenylacetic acid, p-hydroxyphenylacetic acid, p-hydroxybenzyl alcohol, phenolphthalin, oxypropylene-2,2-bis(4-hydroxyphenyl)propane, oxyethylene-p,p'-bisphenol, oxypropylene-bis(4-hydroxyphenyl)thioether and oxybutylene-bis(4-hydroxyphenyl)ketone. Particularly preferred compounds are oxypropylene-2,2-bis(4-hydroxyphenyl)propane, diphenolic acid [i.e. 4,4-bis(p-hydroxyphenyl)-n-valeric acid] and 2,4-dihydroxybenzoic acid.

The compound (C) is used desirably in an amount of 0.05–10 molar % based on the polyol components.

The carboxylic acids used in the present invention are dicarboxylic acids of the general formula [II]:

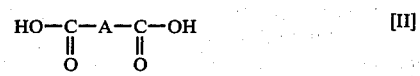

wherein A represents any of $-CH_2-)_n$, $-CH=CH-$, phenylene group or cyclohexylene group and n represents an integer of 1–4 and anhydrides thereof. The carboxylic acids include, for example, fumaric acid, maleic acid, succinic acid, malonic acid, cyclohexane dicarboxylic acid, glutaric acid, adipic acid, phthalic acid, isophthalic acid, terephthalic acid, maleic acid anhydride and phthalic acid anhydride.

The polyol(B) according to the invention is an etherified diphenol of the formula [I]:

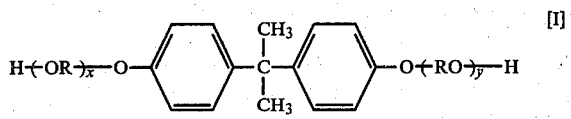

in which R is an alkylene having from 2 to 3 carbon atoms; and x and y are each a positive integer with the proviso that the average sum of both is from 2 to 7. The sum of x and y is preferred to be 2 or 3. Preferable examples of the polyol(B) are polyoxyethylene(3)-2,2-bis(4-hydroxyphenyl)propane, polyoxypropylene(3.2)-2,2-bis(4-hydroxyphenyl)propane, polyoxypropylene(2.2)-2,2-bis(4-hydroxyphenyl)propane and polyoxyethylene(2.5)-2,2-bis(4-hydroxyphenyl)propane.

The polyol(B) alone is used above. Alternatively it may be accompanied with another polyol in an amount of up to 20 mol % based on the polyol(B). The additional polyol includes ethylene glycol, propylene glycol, diethylene glycol, dipropylene glycol, neopentyl glycol, 1,3-dihydroxybutane, 1,4-dihydroxypentane and hydrogenated bisphenol A. Among them, particularly preferred compounds are ethylene glycol, propylene glycol, neopentyl glycol and hydrogenated bisphenol A.

Polyols having 3–6 hydroxyl groups may also be used as the additional polyol. For example, glycerol, trimethylolpropane, sorbitol, pentaerythritol, xylitol, 1,2,3-butanetriol and 1,2,5,6-hexanetetraol can be used.

According to the present invention, reaction of the dicarboxylic acids with specific compounds of the above general formula [I] and the compound (C) is carried out preferably at about 200° C. in an inert atmosphere. Catalysts and promotors generally used in the production of polyester resins may be used in the present invention for increasing the reaction velocity. In case unsaturated dicarboxylic acids are used, it is desirable to incorporate a small amount of a polymerization inhibitor such as hydroquinone or pyrogallol into the reaction mixture. The esterification catalyst or the like is desirably incorporated in a non-excess amount so as to minimize contamination of the polyester products. The reaction is carried out under atmospheric pressure. The reaction may be carried out also under reduced pressure for accelerating the reaction.

The ratio of the dicarboxylic acids to the polyols to be reacted is determined so that ratio of the number of the hydroxyl groups of the polyols to the number of the carboxyl groups of the dicarboxylic acids is 0.8–1.3, preferably 0.9–1.2.

The present invention will be illustrated in more detail by way of examples. In the examples, caking and blocking are examined by the following method:

100 Grams of a powder of a given particle size are allowed to stand at 30°–40° C. under a relative humidity of 30–100%, and if necessary under a load of about 1 kg, for one week. Then, the powder is dropped onto a 40 mesh sieve from a height of 1 m and the solid remaining on the sieve is weighed to obtain a caking index.

EXAMPLE 1

175 Grams (1.507 moles) of fumaric acid, 528 g (1.50 moles) of polyoxypropylene(2.2)-2,2-bis(4-hydroxyphenyl)-propane, 24 g (0.075 mole) of phenolphthalin and 0.3 g of hydroquinone were charged in a 1-liter four-necked round flask provided with a thermometer, stirring rod, dehydrating tube having a flowing-down type condenser and nitrogen-introducing tube. The flask was supported in an electrical heating mantle. Nitrogen gas was introduced therein through the nitrogen-introducing tube in inactivate the gas in the reaction vessel. Then, the electrical heating mantle was used to fuse the starting materials.

The reaction was carried out at a temperature kept at 210° C. for 5 hours while nitrogen gas was introduced at a rate of 5–10 graduations on a flow meter (type KG-2; a product of Kusano Kagaku Kiki Seisaku-sho) (100–150 ml/min). Thereafter, pressure was gradually reduced and the reaction was continued under a pressure of about 100 mm/Hg for 100 minutes until a softening point of 99° C. was attained. The resulting resin had an acid value of 20 mgKOH/g and a melting point of 61.5° C. Molecular weight of the product measured according to the VPO method was 2130.

The thus obtained resin was cooled and pulverized. 0.05 Gram of the powder which passed through a 200 mesh sieve was sprinkled over an end (30 mm$^2$) of a glass cloth (40 mm width×150 mm length) and then another glass cloth of the same size was put thereon. The two glass cloths were pressed together under a load of 1.2 kg at 185° C. for three minutes to obtain a test piece of single lap. The measured adhesive strength of the test piece was 1.4 kg/cm. The measurement was effected by a Shimazu autograph under conditions of a crosshead speed of 50 mm/min and a chart speed of 200 mm/min.

0.025 Gram of the powder of the same particle size as above was sprinkled over an end (25×30 mm) of a glass cloth (25 mm width×150 mm length) and then another glass cloth of the same size was put thereon. They were pressed together under a load of 1.2 kg at 185° C. for three minutes to obtain a test piece of single lap. The test piece was provided with a weight of 20 g and suspended in styrene monomer to measure its solubility in styrene. The result was 4 minutes and 10 seconds.

EXAMPLE 2

179.4 Grams (1.55 moles) of fumaric acid, 528 g (1.50 moles) of polyoxypropylene(2.2)-2,2-bis(4-hydroxyphenyl)propane, 9.3 g (0.075 mole) of p-hydroxybenzyl alcohol and 0.3 g of hydroquinone were reacted together at 210° C. for 5 hours in the same device as in Example 1. Then, pressure was reduced gradually and the reaction was continued under a pressure of about 100 mm/Hg for 90 minutes until a softening point of 99° C. was attained. The resulting resin had an acid value of 20 mg KOH/g and a melting point of 63° C. Molecular weight of the product measured according to the VPO method was 2590.

The thus obtained resin was finely divided into the same particle size as in Example 1. A test piece of single lap was prepared using glass cloths and adhesive strength was measured to obtain a value of 1.6 kg/cm. Solubility of the product in styrene was 3 minutes and 14 seconds.

EXAMPLE 3

204.2 Grams (1.757 moles) of fumaric acid, 616 g (1.75 moles) of polyoxypropylene(2.2)-2,2-bis(4-hydroxyphenyl)propane, 0.5 g (0.0017 mole) of diphenolic acid and 0.34 g of hydroquinone were reacted together at 210° C. for 5 hours in the same device as in Example 1. Then, pressure was reduced gradually and the reaction was continued for about 120 minutes until a softening point of 99° C. was attained. The resulting resin had an acid value of 20 mg KOH/g and a melting point of 61.5° C. The resulting resin had an acid value of 20 mg KOH/g and a melting point of 61.5° C. Molecular weight of the product measured according to the VPO method was 2310.

The thus obtained resin was finely divided into the same particle size as in Example 1. A test piece of single lap was prepared using glass cloths and adhesive strength was measured to obtain a value of 1.6 kg/cm. Solubility of the product in styrene was 4 minutes.

Comparative Example 1

209 Grams (1.8 moles) of fumaric acid, 616 g (1.75 moles) of polyoxypropylene(2.2)-2,2-bis(4-hydroxyphenyl)-propane and 0.33 g of hydroquinone were reacted together at 210° C. for 5 hours in the same device as in Example 1. Then, the reaction was continued under reduced pressure for 110 minutes until a softening point of 99° C. was attained. The resulting resin had an acid value of 21 mg KOH/g and a melting point of only 58° C. Molecular weight of the product measured according to the VPO method was 2450.

The thus obtained resin was finely divided into the same particle size as in Example 1. A test piece of single lap was prepared using glass cloths and adhesive strength was measured to obtain a value of 1.6 kg/cm. Solubility of the product in styrene was 3 minutes and 40 seconds.

EXAMPLE 4

230.7 Grams (1.987 moles) of fumaric acid, 651.2 g (1.85 moles) of polyoxypropylene(2.2)-2,2-bis(4-hydroxyphenyl)propane, 26.5 g (0.09 mole) of diphenolic acid and 0.45 g of hydroquinone were reacted together at 210° C. for 7 hours in the same device as in Example 1. Then, 7.5 g (0.08 mole) of glycerol was added thereto and the reaction was carried out for about 2 hours. Thereafter, pressure was reduced gradually and the reaction was continued for 2 hours till a softening point of 107° C. was attained. The resulting resin had an acid value of 23 mg KOH/g and a melting point of 63° C. Molecular weight of the product measured according to the VPO method was 2610.

The thus obtained resin was finely divided into the same particle size as in Example 1. A test piece of single lap was prepared using glass cloths and adhesion strength was measured to obtain a value of 1.23 kg/cm. Solubility of the product in styrene was 3 minutes and 50 seconds.

EXAMPLE 5

230.7 Grams (1.987 mole) of fumaric acid, 651.2 g (1.85 moles) of polyoxypropylene(2.2)-2,2-bis(4-hydroxyphenyl)propane, 16.3 g (0.057 mole) of oxypropylene-2,2-bis(4-hydroxyphenyl)propane and 0.45 g of hydroquinone were reacted together at 210° C. for 7 hours in the same device as in Example 1. Then 7.5 g (0.08 mole) of glycerol were added thereto and the reaction was carried out for about 2 hours. Thereafter, pressure was reduced gradually and the reaction was continued under 100 mmHg pressure until a softening point of 107° C. was attained. The resulting resin had an acid value of 24 mg KOH/g and a melting point of 61.5° C. Molecular weight of the product measured according to the VPO method was 2650.

Comparative Example 2

230.7 Grams (1.987 moles) of fumaric acid, 678.5 g (1.928 moles) of polyoxypropylene(2.2)-2,2-bis(4-hydroxyphenyl)propane and 0.45 g of hydroquinone were reacted together for 7 hours in the same manner as in Example 1. Then, 7.5 g (0.08 mole) of glycerol was added thereto and the reaction was effected for about 2 hours until a softening point of 107° C. was attained. The resulting resin had an acid value of 24 mg KOH/g and a melting point of only 59° C. Molecular weight of the product measured according to the VPO method was 3000.

The thus obtained resin was finely divided into the same particle size as in Example 1. A test piece of single lap was prepared using glass cloths and adhesion strength was measured to obtain a value of 1.17 kg/cm. Solubility of the product in styrene was 4 minutes.

EXAMPLE 6

473.9 Grams (3.2 moles) of phthalic anhydride, 591.4 g (1.68 moles) of polyoxypropylene(2.2)-2,2-bis(4-hydroxyphenyl)propane, 104.4 g (1.68 moles) of ethylene glycol and 24.7 g (0.16 mole) of 2,4-dihydroxybenzoic acid were reacted together at 210° C. for 8 hours in the same manner as in Example 1. Then, pressure was reduced gradually and the reaction was continued under a reduced pressure of 100 mmHg for about 7 hours until a softening point of 90° C. was attained. The resulting resin had an acid value of 2 mg KOH/g and a melting point of 48° C. Molecular weight of the product measured by the VPO method was 2390.

As compared with Comparative Example 3, the melting point of the product was higher by 3° C., although the softening points were the same.

Comparative Example 3

485.8 Grams (3.28 moles) of phthalic anhydride, 591.4 g (1.68 moles) of polyoxypropylene(2.2)-2,2-bis(4-hydroxyphenyl)propane and 104.4 g (1.68 moles) of ethylene glycol were reacted together at 210° C. for 8 hours in the same manner as in Example 1. Then, pressure was reduced gradually and the reaction was continued under a reduced pressure of 100 mmHg for about 7 hours until a softening point of 90° C. was attained. The resulting resin had an acid value of 2 mg KOH/g and a melting point of only 45° C. Molecular weight of the product measured by the VPO method was 2530.

EXAMPLE 7

191 Grams (1.616 moles) of succinic acid, 184.7 g (0.728 mole) of hydrogenated bisphenol A, 256.7 g (0.728 mole) of polyoxypropylene(2.2)-2,2-bis(4-hydroxyphenyl)-propane and 9.9 g (0.08 mole) of p-hydroxybenzyl alcohol were reacted together at 210° C. for 6 hours in the same manner as in Example 1. Then, 8.6 g (0.064 mole) of trimethylolpropane were added thereto and the reaction was carried out for about 1.5 hours. The reaction was further continued under reduced pressure for about 1.5 hours until a softening point of 92° C. was attained. The resulting resin had an acid value of 25 mg KOH/g and a melting point of 51° C. Molecular weight of the product measured by the VPO method was 2150.

Comparative Example 4

194.6 Grams (1.648 moles) of succinic acid, 194.8 g (0.768 mole) of hydrogenated bisphenol A and 270.3 g (0.768 mole) of polyoxypropylene(2.2)-2,2-bis(4-hydrophenyl)-propane were reacted together at 210° C. for 6 hours in the same manner as in Example 1. Then, 8.6 Grams (0.728 mole) of trimethylol-propane were added thereto and the reaction was carried out for about 1.5 hours. Thereafter, the reaction was further continued under reduced pressure for about 1.5 hours until a softening point of 92° C. was attained. The resulting resin had an acid value of 25 mg KOH/g and a melting point of only 49° C. Molecular weight of the product measured by the VPO method was 2190.

EXAMPLE 8

90 Parts of the resin obtained in Example 1 were kneaded by fusion with 10 parts of carbon black on hot rolls. The mixture was cooled and pulverized, and a powder which passed through a 150 mesh sieve but did not pass through a 200 mesh sieve was collected. This powder was dried at ambient temperature for two days. 40 Grams of the powder were charged in a 50 ml beaker and allowed to stand at 40° C. under a relative humidity of 100% for two days. Caking index measured was 30 (namely, 30 wt. % of the powder was caked). 90 Parts of the resin were kneaded with 10 parts of carbon black by fusion. The mixture was cooled, pulverized and further finely divided with a jet pulverizer to obtain a toner of 5–20 μ. The toner was used for the development according to the cascade method and the magnetic brush method. In both developing methods, clear images were obtained without causing fog or trail in the visualization of the negative electrostatic latent images.

Comparative Example 5

90 Parts of the resin obtained in comparative Example 1 were kneaded by fusion with 10 parts of carbon black on hot rolls. The mixture was cooled and pulverized, and a powder which passed through a 150 mesh sieve but did not pass through a 200 mesh sieve was collected. Caking index thereof was measured in the same manner as in Example 8 to obtain a value of 75 (namely, 75 weight % thereof was caked).

EXAMPLE 9

90 Parts of the resin obtained in Example 5 were kneaded by fusion with 10 parts of carbon black on hot rolls. The mixture was cooled and pulverized and a powder which passed through a 150 mesh sieve but did not pass through a 200 mesh sieve was collected and the caking index thereof was measured in the same manner as in Example 8 to obtain a value of 5 (namely, 5 wt. % thereof was caked.)

The caking index of the product after it was allowed to stand under a load of 920 g for one week was 10. 90 Parts of the resin were kneaded by fusion with 10 parts of carbon black on hot rolls. The mixture was cooled, pulverized and further finely divided with a jet pulverizer to obtain a toner of 5–20μ. The toner was used for the development according to the cascade method and the magnetic brush method. In both developing methods, clear images were obtained without causing fog or trail in the visualization of the negative electrostatic latent images.

Comparative Example 6

90 Parts of the resin obtained in Comparative Example 2 were kneaded by fusion with 10 parts of carbon black on hot rolls. The mixture was cooled and pulverized, and a powder which passed through a 150 mesh sieve but did not pass through a 200 mesh sieve was collected. Caking index thereof was measured in the same manner as in Example 8 to obtain a value of 38 (namely, 38 wt. % of the powder was caked).

Caking index of the product after it was allowed to stand under a load of 920 g for one week was 45.

What is claimed is:

1. A polyester resin composition produced by a reaction of:
  (A) a dicarboxylic acid,
  (B) a polyol comprising an etherified diphenol of the formula:

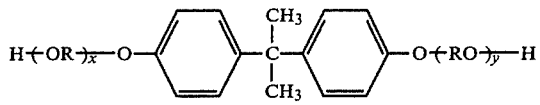

in which R is an alkylene having 2 or 3 carbon atoms; and x and y are each a positive integer with the proviso that the average sum of x plus y is from 2 to 7, and
  (C) from about 0.05 to about 10 mol %, based on the polyol (B), of a compound having, in the molecule, one or two phenolic hydroxy groups and either (i) an alcoholic hydroxy group or (ii) a carboxy group.

2. A polyester resin composition as claimed in claim 1 in which said reaction is effected at a proportion of the number of hydroxyl groups to that of carboxyl groups of the dicarboxylic acid of from 0.8 to 1.3.

3. A polyester resin composition as claimed in claim 1 in which the polyol(B) contains another polyol in an amount of up to 20 mol. %, based on the polyol(B) of said formula.

4. A polyester resin composition as claimed in claim 1 in which the dicarboxylic acid has the formula:

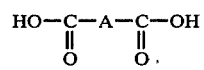

wherein A is $-CH_2)_n$,$-CH=CH-$, phenylene or cyclohexylene and n is an integer of one to four, or an anhydride thereof.

5. A polyester resin composition as claimed in claim 1 in which the compound (C) is selected from the group consisting of diphenolic acid, p-hydroxybenzoic acid, 2,4-dihydroxybenzoic acid, p-hydroxyphenylacetic acid, p-hydroxybenzyl alcohol, phenolphthalin, oxypropylene-2,2-bis(4-hydroxyphenyl)propane, oxyethylene-p,p'-bisphenol, oxypropylene-bis(4-hydroxyphenyl)thioether and oxybutylene-bis(4-hydroxyphenyl)ketone.

6. A polyester resin composition as claimed in claim 1, in which the polyol(B) is selected from the group consisting of polyoxyethylene(3)-2,2-bis(4-hydroxyphenyl)propane, polyoxypropylene(3.2)-2,2-bis(4-hydroxyphenyl)propane, polyoxypropylene(2.2)-2,2-bis(4-hydroxyphenyl)propane and polyoxyethylene(2.5)-2,2-bis(4-hydroxyphenyl)propane.

* * * * *

UNITED STATES PATENT AND TRADEMARK OFFICE
CERTIFICATE OF CORRECTION

PATENT NO. : 4 314 049
DATED : February 2, 1982
INVENTOR(S) : Shinichiro Yasuda

It is certified that error appears in the above—identified patent and that said Letters Patent is hereby corrected as shown below:

Column 8, line 30; change to read as follows:

---wherein A is $-(CH_2)_n-$, $-CH=CH-$, phenylene or---.

Signed and Sealed this

Twenty-seventh Day of April 1982

[SEAL]

Attest:

GERALD J. MOSSINGHOFF

Attesting Officer     Commissioner of Patents and Trademarks